United States Patent [19]

Delonge-Immik et al.

[11] Patent Number: 5,211,306
[45] Date of Patent: May 18, 1993

[54] PRESSURE VESSEL FOR STORING A PRESSURE MEDIUM

[75] Inventors: Gudrun Delonge-Immik, Kornwestheim; Wolfgang Henseler, Tübingen; Heinz Knoll, Stuttgart; Wolf-Dietrich Münzel, Altdorf, all of Fed. Rep. of Germany

[73] Assignee: Mercedes-Benz AG, Fed. Rep. of Germany

[21] Appl. No.: 839,551

[22] Filed: Feb. 24, 1992

[30] Foreign Application Priority Data

Feb. 23, 1991 [DE] Fed. Rep. of Germany ....... 4105787

[51] Int. Cl.$^5$ ............................................... B65D 1/16
[52] U.S. Cl. ..................................... 220/588; 220/590
[58] Field of Search .............. 220/588, 589, 590, 4.21, 220/4.24

[56] References Cited

U.S. PATENT DOCUMENTS

| | | | |
|---|---|---|---|
| 3,047,191 | 7/1962 | Young | 220/588 |
| 3,508,677 | 4/1970 | Laibson et al. | 220/590 |
| 3,969,812 | 7/1976 | Beck | 220/590 X |
| 4,778,073 | 10/1988 | Ehs | 220/590 |
| 4,785,956 | 11/1988 | Kepler et al. | 220/590 |
| 4,905,856 | 3/1990 | Krogager | 220/588 |
| 5,025,943 | 6/1991 | Forsman | 220/589 |

FOREIGN PATENT DOCUMENTS

| | | |
|---|---|---|
| 0104958 | 4/1984 | European Pat. Off. . |
| 0261309 | 3/1988 | European Pat. Off. . |
| 1425510 | 11/1968 | Fed. Rep. of Germany . |
| 1925131 | 11/1969 | Fed. Rep. of Germany . |
| 1501701 | 5/1970 | Fed. Rep. of Germany . |
| 2516395 | 1/1984 | Fed. Rep. of Germany . |
| 3416725 | 11/1984 | Fed. Rep. of Germany . |
| 8408506 | 2/1985 | Fed. Rep. of Germany . |
| 3426158 | 12/1985 | Fed. Rep. of Germany . |
| 843035 | 8/1960 | United Kingdom . |
| 1104974 | 3/1968 | United Kingdom . |
| 2110566 | 6/1983 | United Kingdom . |
| 2128312 | 4/1984 | United Kingdom . |

*Primary Examiner*—Steven M. Pollard
*Attorney, Agent, or Firm*—Evenson, McKeown, Edwards & Lenahan

[57] ABSTRACT

A pressure vessel for storing a highly pressurized pressure medium for use with motor vehicle air bags and the like has an elongated, pressure-tightly closable hollow body as well as at least one opening for the flowing-out of the pressure medium. The vessel can be made small and light by surrounding the circumference of the hollow body with a fiber composite winding.

12 Claims, 1 Drawing Sheet

PRESSURE VESSEL FOR STORING A PRESSURE MEDIUM

CROSS-REFERENCE TO RELATED APPLICATION

This application is related to application Ser. No. 07/843,056 filed on Mar. 2, 1992.

BACKGROUND AND SUMMARY OF THE INVENTION

The present invention relates to a pressure vessel for storing a pressure medium, in particular a gas, having an elongated, pressure-tightly closable hollow body as well as having at least one valve-closable opening for the flowing-out of the pressure medium, the circumference of the hollow body being surrounded by a fiber composite winding and the hollow body being essentially rotationally symmetrical.

A pressure vessel is disclosed, for example, in DE 25 16 395 C2. The present invention is based on the object of optimizing a pressure vessel of the known type, in particular with regard to its connections.

This object has been achieved according to the present invention by the hollow body being provided with a plurality of radially outward-protruding connections distributed symmetrically over its circumference. Two mutually diametrically opposite connections are provided with outflow valves, the others serve for fitting further functional elements. The connections protrude outwardly so as not to be covered by the fiber composite winding. The connections consequently protrude outwards through the fiber composite winding.

In one embodiment of the present invention, the hollow body has a central functional member which is provided with the connections. The member is arranged at the same distance from both end faces of the hollow body and two half-shell-like vessel parts are gas-tightly connected thereto on both sides. Since the connections are located merely in the center of the hollow body, the wrapping of the hollow body with reinforcing fibers is facilitated. This produces a symmetrical distribution of the fiber composite over the circumference of the hollow body.

According to a further feature of the present invention, the hollow body can also be provided only with a functional member arranged at the end. The member is provided with the connections and closed on one side, with a half-shell-like vessel part connected pressure-tightly on its opposite side. The pressure vessel of such a configuration is suitable in particular for arrangement within a gas-cushion protective device for the driver of a passenger car, in which case the device is accommodated in the steering wheel of the car. Here too, the advantages of small installation space and low weight are obtained. In a further embodiment, the functional member is provided with a thicker wall thickness than the vessel parts. The functional member is therefore more stable than the vessel parts, so that the fiber composite winding can be kept thinner in the region of the connections.

Yet another feature of the present invention utilizes winding of reinforcing fibers as a fiber composite winding in a plurality of plies around the hollow body. The fibers are set in predetermined matrix and laminate structure with respect to one another and on the hollow body by a composite resin. In one embodiment, aramid fibers can be provided as reinforcing fibers. These aramid fibers are extremely tough and tear-resistant so that splintering in the event of an unintentional bursting of the pressure vessel is prevented. In comparison with a purely metallic high-pressure accumulator, such a fiber wrapping also offers considerably greater safety reserves before bursting takes place. The pressure vessel can store without any problems gas under a pressure of 400 to 500 bar even over a long period of time, for example the entire service life of a passenger car.

In yet another embodiment of the present invention, at least one layer of reinforcing fibers of the laminate structure is wound in the circumferential direction around the hollow body. In a still further embodiment, the laminate structure has at least two layers of reinforcing fibers which are wound around the hollow body crossing one another and aligned at a acute angle to the axial direction. As a result, allowance is made for the stresses occurring both in the circumferential direction and in the axial direction. Since at least three fibre layers are provided, running at different angles over the outer contour of the hollow body, laminate gaps occurring during production can also be largely closed.

BRIEF DESCRIPTION OF THE DRAWINGS

These and further objects, features and advantages of the present invention will become more apparent from the following detailed description of currently preferred embodiments when taken in conjunction the invention when considered in conjunction with the accompanying drawings wherein.

DETAILED DESCRIPTION OF THE DRAWINGS

Figure 1:
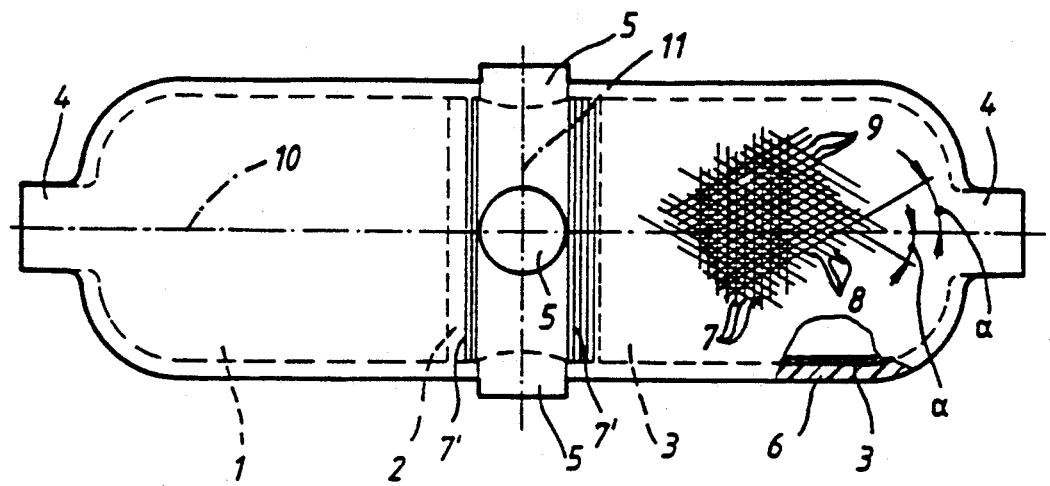
FIG. 1 is a plan view of one embodiment of a pressure vessel according to the present invention provided with a central functional member and surrounded by a fiber composite winding.

The pressure vessel comprising parts designated by numerals 1, 2, 3, 6 in FIG. 1 is part of a gas-cushion protective device, e.g. an air-bag, for the front-seat passenger of a passenger car. The device is arranged in front of the front passenger seat in a specifically designed compartment of the dashboard. The glove compartment in front of the front passenger seat is not adversely affected by the gas-cushion protective device and is located, for example, below the compartment for the gas-cushion protective device. The pressure vessel stores an inert gas, e.g. nitrogen, which discharges from the pressure vessel into a gas cushion within a few milliseconds in the event of an accident, as a result of which the gas cushion is inflated and the front passenger is restrained in the front passenger seat.

In order to take up only a small space in the region of the dashboard, the pressure vessel comprising parts 1, 2, 3, 6 has relatively small dimensions. In the illustrated embodiment, the pressure vessel has a length of about 200 to 250 mm and a diameter of about 60 mm. In order to be able to inflate the gas cushion, which has a volume of about 150 to 170 l, within the desired time by the gas stored in the pressure vessel, the gas in the pressure vessel is under a very high pressure, e.g. about 400 to 500 bar. In order to be able to withstand these high pressures even over a long period of time of up to 15 years, the pressure vessel is of the special configuration described below.

The pressure vessel 1, 2, 3, 6 consists of a hollow body made of light metal, e.g. aluminum, which is essentially rotationally symmetrical to a longitudinal axis 10. The hollow body is essentially hollow-cylindrical and is closed at both its end faces and provided in each case with a support stud 4 for fastening in the region of the dashboard. The hollow body has in its center a central functional member 2 which is produced from a forged, annular hollow-profile part. This functional member 2 is provided with four connections 5 which are distributed diametrically in each case over its circumference. The connections 5 have cylindrical shape and protrude radially outwards from the functional member 2.

Welded gas-tightly onto the two opposite end faces of the functional member 2 are two half-shell-like vessel parts 1 and 3, which are in each case produced by extrusion. The wall thicknesses of the vessel parts 1, 3 are less than that of the functional member 2. The wall of the functional member 2 is therefore more stable than that of the vessel parts 1, 3. Two mutually opposite connections 5 of the functional member 2 are provided with outflow openings, into which in each case an outflow valve is gas-tightly welded. A third connection 5 is provided with a hermetically sealed pyrotechnic system which is integrated in the functional member 2 and which, when ignited, moves a piston which bends the outflow valves along predetermined breaking points and consequently releases the outflow openings into the gas cushion.

Due to the mutually opposite outflow valves, a repulsion-free outflow of the gas into the gas cushion is achieved. In one support stud 4 or else in the fourth connection 5 there is a gas-tightly closable filling opening, through which the gas is brought into the interior of the vessel. Filling does not take place, however, after completion of the hollow body comprised by parts 1, 2, 3 but only after completion of the entire pressure vessel comprising the parts 1, 2, 3 and fiber composite winding 6. In order to reinforce the already gas-tight hollow body 1, 2, 3 made of light metal to such an extent that it also withstands the required high pressures, it is provided with a fiber composite winding 6. This fiber composite winding 6 comprises a plurality of plies of reinforcing fibers 7, 8, 9, which are wound around the hollow body 1, 2, 3 to form a predetermined, load-bearing laminate structure by way of a composite adhesive, for example an epoxy resin. Depending on the application, aramid fibers, carbon fibers and glass fibers serve as the reinforcing fibers 7, 8, 9. In order, however, to avoid splintering in the event of the pressure vessel parts 1, 2, 3, 6 bursting, at least part of the laminate structure consists of the extremely tough and tear-resistant aramid fibers.

In the embodiment according to FIG. 1, the laminate structure of the fiber composite winding 6 comprises various layers of parallel-laying fibers 7, 8, 9, which are wound, for example, at three different angles around the hollow body parts 1, 2, 3, in order to allow for the stresses occurring in the circumferential direction and in the axial direction. In the wrapping of the hollow body parts 1, 2, 3, the latter serves as a liner which ensures the tightness of the pressure vessel parts 1, 2, 3, 6. This hollow body comprised of parts 1, 2, 3 forms the core for the actually load-bearing structure of the fiber composite winding 6. Some fibers 7 of the parallel reinforcing fibers ar wound around the hollow body parts 1, 2, 3 in a circumferential direction, i.e. in each case running perpendicularly to the imaginary longitudinal axis 10, with the inner end windings 7 surrounding the functional member 2 only as far as the connections 5. This is expedient since, on one hand, the functional member 2 consists of a forged hollow-profile part and has a greater wall thickness than the vessel parts 1, 3, so that it has a greater stability than the two vessel parts 1, 3, and, on the other hand, since the wrapping surface area of the functional member 2 is reduced by the four outwardly protruding connections 5 and full wrapping at all three angles of the crossing fibers 7, 8, 9 with reinforcing fibers in this region would result in an unnecessary thickening of the laminate structure. All the reinforcing fibers are set with respect to one another and on the hollow body parts 1, 2, 3 by the epoxy resin, with which they can be impregnated beforehand.

Other reinforcing fibers are wound around the hollow body parts 1, 2, 3 spirally in opposite directions crossing one another at an acute angle ($\alpha$) symmetrically to the longitudinal axis 10. These layers 8, 9 of reinforcing fibers also extend over the region of the functional member 2 between the connections 5. The four connections 5 are also wrapped as well by applying winding layers at, for example, five different winding angles. Losses in strength on account of consequent laminate gaps in this region are offset by the greater wall thickness of the functional member 2. The winding angles in this region are, for example, symmetrical to the longitudinal axis 10, at $\pm 15°$, $\pm 30°$ and $90°$. Due to the different winding angles of the layers 7, 8, 9 of reinforcing fiber, laminate gaps occurring during wrapping are also largely closed.

For wrapping, the optimum thread line is calculated and then realized in the best-possible approximation by the position of the fiber composite winding. The various layers 7, 8, 9 of reinforcing fibers can be wound one over the other in a plurality of plies in each case, either one ply being laid at a time alternately at one angle then the other 7, 8, 9, or at first one layer 7 or 8 or 9 being wound completely in a plurality of plies, which are then followed by the other layers 7 or 8 or 9, respectively. It is also possible to wind the reinforcing fibers entwined such that they form a plaited work on the hollow body parts 1, 2, 3. The hollow body formed by parts 1, 2, 3 forming the winding core or liner is clamped in the lathe of a winding machine for wrapping. Reinforcing fibers 7, 8, 9 are wound onto the rotating hollow body 1, 2, 3 as continuous fiber strands or rovings which have passed through an epoxy resin bath for impregnation with the resin matrix. The different winding angles are produced by thread guiding devices which are movable parallel to the longitudinal axis 10 of the hollow body and are moved at various speeds on supports. By way of two supports moved at different speeds, circumferential and cross-angle plies are applied simultaneously and consequently interwoven. In this manner, the laminate gaps produced in the region of the connections 5 of the functional member are prevented from being able to grow to ply thickness before they are, for example, closed by circumferential plies or reduced by a second cross-angle ply.

After completing and curing the fiber composite winding, the pressure vessel parts 1, 2, 3, 6 can be filled with gas. The safety reserves of the pressure vessel comprised of the parts 1, 2, 3, 6 reinforced by the fiber composite winding 6 are thus so great that, even if the pressure vessel is overloaded, bursting can be ruled out with great certainty.

Figure 2:
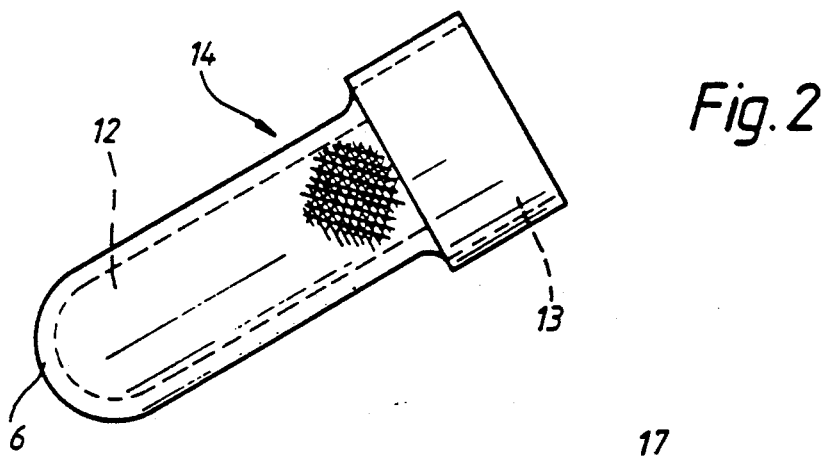
FIG. 2 is a plan view of another embodiment of a pressure vessel likewise surrounded by a fiber composite winding, but the functional member is fitted at the end.
Figure 3:
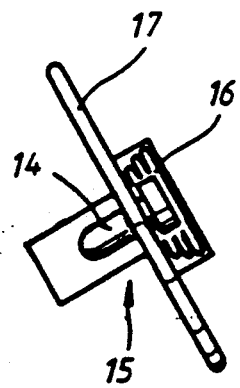
FIG. 3 is a plan view of an arrangement of the pressure vessel according to FIG. 2 in a gas-cushion protective device for the driver of a passenger car arranged in the region of the steering wheel.

In the case of another embodiment according to FIGS. 2 and 3, a pressure vessel 14 is configured such that it can be fitted in a gas-cushion protective device for a passenger car driver. This gas-cushion protective device 15 (FIG. 3) is attached in the region of a steering wheel 17 of the passenger car. Since the driver's gas cushion 16 has a smaller volume than that of the front passenger, the pressure vessel 14 can be kept correspondingly smaller. The pressure vessel 14 comprises a hollow body 12, 13, which is likewise surrounded by a fiber composite winding 6. The fiber composite winding 6 corresponds essentially to that of the pressure vessel according to FIG. 1, so that a further detailed description is unnecessary here.

The hollow body 14 comprises a functional member 13, on which a half-shell-shaped vessel part 12 is welded gas-tightly only on one end face. The other end face of the functional member 13 is closed. The functional member 13 has, similar to the functional member 2 in the embodiment of FIG. 1, radially outward-protruding connections for the outflow openings (not shown). The radial arrangement of the connections has, however, the advantage of a largely repulsion-free outflow of the gas into the gas cushion 16. On account of its small size and its nevertheless great stability, the pressure vessel 14 can be integrated directly in the steering wheel 17.

Other embodiments of the pressure vessels, which are filled with other pressure media for other intended applications, may also be provided without departing from the basic configuration of a hollow body of light metal in connection with a fiber composite winding reinforcing the latter in accordance with the present invention. Such pressure vessels serve, for example, as pressure-equalizing vessels for tire or air-suspension systems, or else as hydraulic accumulators.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A pressure vessel for storing a pressure medium, comprising an elongated, pressure-tightly closable hollow body, at least one valve-closable opening for the flowing-out of the pressure medium, surrounded by a fiber composite winding surrounding the circumference of the hollow body, said hollow body comprising two half-shell-like vessel parts being pressure-tightly connected on both sides of the annular functional member, the hollow body being essentially rotationally symmetrical, and a plurality of radially outward-protruding connections in communication with the pressure medium distributed symmetrically over the circumference of said functional member.

2. The pressure vessel according to claim 1, wherein said annular functional member is arranged equidistantly from end faces of the hollow body.

3. The pressure vessel according to claim 1, wherein the hollow body is provided with said functional member arranged at an end thereof, said member being closed on one side and with a half-shell-like vessel part connected pressure-tightly on an opposite side thereof.

4. The pressure vessel according to claim 1, wherein reinforcing fibers are wound as a fiber composite winding in a plurality of plies around the hollow body, which fibers are set by a resin matrix in a predetermined laminate structure with respect to one another and on the hollow body.

5. The pressure vessel according to claim 4, wherein at least one layer of the reinforcing fibers of the laminate structure is wound perpendicularly to longitudinal axis of the hollow body.

6. The pressure vessel according to claim 4, wherein the laminate structure has at least two layers of reinforcing fibers wound around the hollow body crossing one another and aligned in each case at an acute angle to a longitudinal direction of the hollow body.

7. The pressure vessel according to claim 6, wherein at least one layer of the reinforcing fibers of the laminate structure is wound perpendicularly to longitudinal axis of the hollow body.

8. The pressure vessel according to claim 6, wherein the reinforcing fibers cross one another symmetrically to the longitudinal direction.

9. The pressure vessel according to claim 4, wherein the reinforcing fibers entwine in a plaited manner.

10. The pressure vessel according to claim 9, wherein at least one layer of the reinforcing fibers of the laminate structure is wound perpendicularly to longitudinal axis of the hollow body.

11. The pressure vessel according to claim 10, wherein the laminate structure has at least two layers of reinforcing fibers wound around the hollow body crossing one another and aligned in each case at an acute angle to a longitudinal direction of the hollow body.

12. The pressure vessel according to claim 11, wherein the reinforcing fibers cross one another symmetrically to the longitudinal direction.

* * * * *